United States Patent Office 2,933,496
Patented Apr. 19, 1960

2,933,496

10-AMINOALKANOLPHENOTHIAZINE OXIDES

Richard V. Heinzelman, Kalamazoo Township, Kalamazoo County, and Robert B. Moffett and Brooke D. Aspergren, Kalamazoo, Mich., assignors to The Upjohn Company, Kalamazoo, Mich., a corporation of Michigan No Drawing. Application December 5, 1957
Serial No. 700,758

6 Claims. (Cl. 260—243)

This invention relates to novel 10-aminoalkanolphenothiazine sulfoxides and the N-oxides thereof.

The novel compounds have the following general structural formula:

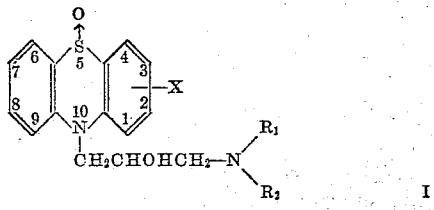

wherein X is a nuclear substituent selected from the group consisting of halogen, i.e., chlorine, bromine, fluorine, and iodine, lower-alkoxy, e.g., methoxy, ethoxy, butoxy, and the like, and trihalomethyl, e.g., trifluoromethyl and trichloromethyl; $R_1$ and $R_2$ when taken singly each represent an alkyl radical, preferably a lower-alkyl radical, i.e., from one to eight carbon atoms, inclusive, such as methyl, ethyl, propyl, butyl, octyl, and the like, and wherein $R_1$ and $R_2$ when taken collectively form an alkylene radical or an oxa-alkylene radical joined to the nitrogen thus constituting with the nitrogen atom a cyclic aliphatic amino group such as pyrrolidyl, piperidyl, morpholinyl, or the like. Either or both of $R_1$ and $R_2$ can contain branched substituents such as methyl groups, as are found in the polymethyl-substituted-pyrrolidyl compounds hereinafter described. The sulfoxide compounds can exist in the free base form or in the form of acid addition salts, quaternary ammonium salts, the N-oxide and the N-oxide acid addition salts.

The novel compounds of this invention possess valuable therapeutic properties, e.g., they are drug potentiators and tranquilizing agents. They are conveniently administered orally. The novel compounds of the invention also possess diuretic activity which is superior to that of the parent, unoxidized 10-aminoalkanolphenothiazine compounds.

The novel compounds of this invention are prepared by oxidizing a 10-aminoalkanolphenothiazine with an oxidizing agent, using the appropriate reaction conditions, to produce the corresponding sulfoxide or N,5-dioxide according to the procedures disclosed more fully hereinafter.

The 10-aminoalkanolphenothiazine starting compounds of this invention are conveniently prepared by reacting a nuclear-substituted phenothiazine of the formula:

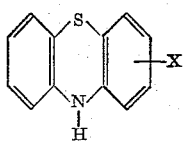

wherein X has the same meaning as given above, with an epihalohydrin of the formula:

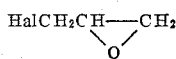

wherein Hal is a halogen such as chlorine or bromine, and condensing the reaction product formed with a secondary amine of the formula:

wherein $R_1$ and $R_2$ have the same meanings as given above, to form 10-aminoalkanolphenothiazines which, if desired, can be converted in known manner to their corresponding acid addition salts or quaternary ammonium salts.

The 10-aminoalkanolphenothiazine starting compounds, preferably in the form of their acid addition salts or quaternary ammonium salts, can be transformed into their sulfoxides by oxidation with an approximately equimolar amount of a peroxidizing agent such as hydrogen peroxide, peracetic acid, or perbenzoic acid. The reaction is advantageously carried out in an inert reaction medium, preferably a solvent such as aqueous ethanol, aqueous methanol, aqueous isopropanol, or other aqueous or absolute lower alkanol, water, mixtures of lower alkanols, aqueous acetone or acetone. The reaction temperature can range from zero to 100 degrees centigrade, room temperature ordinarily being satisfactory and convenient. The reaction product is conveniently recovered from the reaction mixture by separation from the reaction medium in known manner, the product being the sulfoxide acid addition salt or quaternary ammonium salt corresponding otherwise to the starting compound. The sulfoxide acid addition salt can be converted to the sulfoxide free base by reaction with an alkali in known manner. The sulfoxide free base can be converted to acid addition salts of pharmacologically acceptable acids by reaction with the appropriate acid, e.g., hydrochloric, hydrobromic, hydriodic, sulfuric, citric, acetic, succinic, benzoic, salicylic, lactic, nitric, phosphoric, glycolic, tartaric, ascorbic, and the like. The sulfoxide free base can likewise be converted by known methods to the corresponding quaternary ammonium salts, e.g., methobromide, methiodide, ethobromide, ethochloride, benzyl chloride, ethyl para-toluenesulfonate, and the like.

The 10-aminoalkanolphenothiazine starting compounds can be transformed into their amine oxide sulfoxides, i.e., their N,5-dioxides, by reacting the 10-aminoalkanolphenothiazines with approximately two to three molar proportions of a peroxidizing agent under the reaction conditions described in the foregoing paragraph with regard to the preparation of the sulfoxides. The reaction products are recovered as the N,5-dioxide free bases. The N,5-dioxide free bases are reacted with a pharmacologically acceptable acid to convert them into their corresponding acid addition salts, e.g., the hydrochloride, hydrobromide, sulfate, citrate, acetate, succinate, benzoate, salicylate, lactate, nitrate, phosphate, glycolate, tartrate, ascorbate, and the like.

The N,5-dioxide free bases can be prepared alternatively by further oxidation of the 10-aminoalkanolphenothiazine sulfoxide free bases, under the peroxidizing reaction conditions previously described, using approximately equimolar amounts of the peroxidizing agent.

Alternatively, the sulfoxide compounds can be prepared by reacting the sulfoxide of a nuclear substituted phenothiazine with an epihalohydrin and condensing the reaction product formed with a secondary amine to form a 10-aminoalkanolphenothiazine sulfoxide which, if desired, can then be converted to the corresponding acid addition or quaternary ammonium salt.

The term "N,5-dioxide" as used herein refers to the nuclear sulfur atom at the 5-position and the nitrogen atom occurring in the side-chain that is attached to the phenothiazine nucleus at position 10.

In the foregoing description, the following examples, and in the claims, the Chemical Abstracts system of numbering the phenothiazine nucleus is used; see structural Formula I above.

This application is a continuation-in-part of application Serial No. 614,808, field October 9, 1956.

The following examples are illustrative of the process and products of the present invention, but are not to be construed as limiting.

EXAMPLE 1

*10 - (3 - dimethylamino - 2 - hydroxypropyl) - 2 - chlorophenothiazine sulfoxide hydrochloride*

A mixture of 37.1 grams (0.1 mole) of 10-(3-dimethylamino-2-hydroxypropyl) - 2 - chlorophenothiazine hydrochloride, 15.5 grams (0.136 mole) of thirty percent hydrogen peroxide and 145 milliliters of ethanol was stirred until all the solid dissolved. The solution obtained was allowed to stand for 72 hours and then heated under reflux for two hours. The refluxed solution was allowed to cool and there was added thereto an aqueous slurry of thirty percent platinum-on-charcoal, followed by stirring for two hours. The mixture was then filtered and the filtrate obtained was distilled nearly to dryness under reduced pressure. The concentrated solution, upon standing, deposited crystalline material. Recrystallization from about 180 milliliters of isopropanol gave 22.8 grams (59 percent) of crystals having a melting point of 213–215 degrees centigrade. An additional yield of 2.77 grams of crystals was obtained from the isopropanol mother liquid and they were combined with the 22.8 grams first obtained. The combined crystal mass was then further recrystallized from a mixture of isopropanol, water, and acetone, with decolorizing carbon treatment, to give 21.5 grams of nearly white crystals of 10-(3-dimethylamino-2-hydroxypropyl) - 2 - chlorophenothiazine sulfoxide hydrochloride having a melting point of 215–217 degrees centigrade.

*Analysis.*—Calcd. for $C_{17}H_{20}Cl_2N_2O_2S$: C, 52.17; H, 5.20; N, 7.23; Cl, 18.31; S, 8.28. Found: C, 52.97; H, 5.07; N, 6.97; Cl, 18.44; S, 8.17.

By treating 10-(3-dimethylamino - 2 - hydroxypropyl)-2-chlorophenathiazine sulfoxide hydrochloride with five percent aqueous sodium hydroxide solution, extracting the reaction mixture three times with ether, washing the ether solution with water and saturated aqueous sodium chloride solution, distilling the washed ether solutions to remove the ether, 10-(3-dimethylamino - 2 - hydroxypropyl)-2-chlorophenothiazine sulfoxide can be obtained.

By reacting 10-(3-dimethylamino - 2 - hydroxypropyl)-2-chlorophenothiazine sulfoxide with a pharmacologically acceptable acid the corresponding acid addition salt can be obtained, e.g., 10-(3-dimethylamino - 2 - hydroxypropyl)-2 - chlorophenothiazine sulfoxide hydrobromide, hydriodide, sulfate, citrate, acetate, succinate, benzoate, salicylate, lactate, nitrate, phosphate, glycolate, tartrate, and ascorbate.

EXAMPLE 2

*10 - (3 - dimethylamino - 2 - hydroxypropyl) - 2 - chlorophenothiazine N,5-dioxide*

To 37.1 grams (0.1 mole) of 10-(3-dimethylamino-2-hydroxypropyl) - 2-chlorophenothiazine hydrochloride, there was added 100 milliliters of five percent aqueous sodium hydroxide solution. The reaction mixture obtained was extracted three times with ether. The ether solutions were washed with water and saturated aqueous sodium chloride solution and distilled nearly to dryness. The residue was dissolved in 100 milliliters of ethanol and 35 milliliters of thirty percent hydrogen peroxide was added and the solution was allowed to stand at room temperature for 120 hours. There was then added an aqueous slurry of about 0.1 gram of thiry percent platinum-on-charcoal and the mixture was shaken for three hours to allowed to stand overnight. The mixture was filtered and the filtrate was distilled nearly to dryness, under reduced pressure, while maintaining the temperature below 50 degrees centigrade. The residue crystallized. Recrystallization from a mixture of isopropanol and acetone gave 23.9 grams (62.7 percent) of white solid 10-(3-dimethylamino - 2 - hydroxypropyl)-2-chlorophenothiazine N,5-dioxide having a melting point of 163–164 degrees centigrade.

*Analysis.*—Calcd. for $C_{17}H_{19}ClN_2O_3S$: N, 7.64; Cl, 9.66; S, 8.74. Found: N, 7.62; Cl, 9.63; S, 8.38.

By the dropwise addition of a slight excess of ethereal hydrogen chloride, with stirring, to an ice-bath-cooled dry ether solution of 10-(3-dimethylamino - 2-hydroxypropyl)-2-chlorophenothiazine N,5-dioxide, 10 - (3-dimethylamino - 2 - hydroxypropyl)-2-chlorophenothiazine N,5-dioxide hydrochloride can be obtained.

By reacting 10 - (3 - dimethylamino - 2 - hydroxypropyl) - 2 - chlorophenothiazine N,5-dioxide with other pharmacologically acceptable acids the corresponding acid addition salts can be obtained, e.g., 10-(3-dimethylamino-2-hydroxypropyl)-2-chlorophenothiazine N,5-dioxide hydrobromide, sulfate, citrate, acetate, succinate, benzoate, salicylate, lactate, nitrate, phosphate, glycolate, tartrate, and ascorbate.

EXAMPLE 3

*10 - [3 - (2,2 - dimethyl - 1 - pyrrolidyl) - 2 - hydroxypropyl]-2-chlorophenothiazine sulfoxide hydrochloride*

Substituting the stoichiometric equivalent of 10-[3-(2, 2 - dimethyl - 1 - pyrrolidyl) - 2 - hydroxypropyl] - 2-chlorophenothiazine hydrochloride as the starting material in place of 10-(3-dimethylamino-2-hydroxypropyl)-2-chlorophenothiazine hydrochloride and following the procedure of Example 1 without any other change, 10-[3-(2,2-dimethyl-1-pyrrolidyl)-2-hydroxypropyl] - 2 - chlorophenothiazine sulfoxide hydrochloride can be obtained.

The sulfoxide compounds of other phenothiazine hydrochlorides, e.g., 10-(3-diethylamino-2-hydroxypropyl)-2-trifluoromethylphenothiazine hydrochloride, 10-[3-(1-pyrrolidyl) - 2 - hydroxypropyl] - 2 - trifluoromethylphenothiazine hydrochloride, 10-[3-(N-methylisopropylamino) - 2 - hydroxypropyl] - 2 - trifluoromethylphenothiazine hydrochloride, 10-(3-diethylamino-2-hydroxypropyl)-2-ethoxyphenothiazine hydrochloride, 10-[3-(1-pyrrolidyl) - 2 - hydroxypropyl] - 2 - ethoxyphenothiazine hydrochloride, 10-[3-(N-methylisopropylamino)-2-hydroxypropyl] - 2 - ethoxyphenothiazine hydrochloride, 10 - (3 - diethylamino - 2 - hydroxypropyl) - 4 - chlorophenothiazine hydrochloride, 10 - [3 - (1 - pyrrolidyl)-2 - hydroxypropyl] - 4 - chlorophenothiazine hydrochloride, 10 - [3 - (N - methylisopropylamino) - 2 - hydroxypropyl]-4-chlorophenothiazine hydrochloride and 10-[3-(4 - morpholinyl) - 2 - hydroxypropyl] - 2 - chlorophenothiazine hydrochloride can be produced by substituting the stoichiometric equivalent of the appropriate phenothiazine hydrochloride starting compound and following the procedure of Example 1 without any other change.

EXAMPLE 4

*10 - [3 - (2,2 - dimethyl - 1 - pyrrolidyl) - 2 - hydroxypropyl]-2-chlorophenothiazine N,5-dioxide*

Substituting the stoichiometric equivalent of 10-[3-(2,2 - dimethyl - 1 - pyrrolidyl) - 2 - hydroxypropyl]-2-chlorophenothiazine hydrochloride as the starting material in place of 10-(3-dimethylamino-2-hydroxypropyl)-2-chlorophenothiazine hydrochloride and following the procedure of Example 2 without any other change, 10- [3 - (2,2 - dimethyl - 1 - pyrrolidyl) - 2 - hydroxypropyl]-2-chlorophenothiazine N,5-dioxide can be obtained.

The N,5-dioxide free base compounds of other phenothiazines can be produced by substituting the stoichiometric equivalent of the appropriate phenothiazine hydrochloride starting compound, e.g., those phenothiazine hydrochlorides named following Example 3, and following the procedure of Example 2 without any other change.

All of the phenothiazine sulfoxide hydrochlorides disclosed herein, such as those disclosed in Examples 1 and 3, as well as any other phenothiazine sulfoxide hydrochlorides within the scope of this invention can be converted to the phenothiazine sulfoxide free bases by reacting them with alkali such as sodium hydroxide and extracting the resulting sulfoxide free bases with ether. Each of the phenothiazine sulfoxide free bases can then be converted to acid addition salts, e.g., the hydrobromide, hydriodide, sulfate, citrate, acetate, succinate, benzoate, salicylate, lactate, nitrate, phosphate, glycolate, tartrate, ascorbate, and the like, by neutralization with the appropriate acid.

By reaction of a phenothiazine sulfoxide free base, e.g., 10 - (3 - dimethylamino - 2 - hydroxypropyl) - 2 - chlorophenothiazine sulfoxide with methyl bromide, advantageously in solution in methyl ethyl ketone, 10-(3-dimethylamino - 2 - hydroxypropyl) - 2 - chlorophenothiazine sulfoxide methobromide can be produced. Similarly, all of the phenothiazine sulfoxide free bases disclosed herein as well as any other phenothiazine sulfoxide free bases within the scope of this invention can be reacted with methyl bromide to obtain their corresponding methobromides. By substituting methyl iodide, ethyl bromide, ethyl chloride, benzyl chloride, or ethyl paratoluenesulfonate for methyl bromide, the corresponding methiodide, ethobromide, ethochloride, benzyl chloride or ethyl paratoluenesulfonate of 10-(3-dimethylamino-2-hydropropyl)-2-chlorophenothiazine sulfoxide and other phenothiazine sulfoxide free bases can be obtained.

All of the phenothiazine N,5-dioxide free bases disclosed herein, such as those disclosed in Examples 2 and 4, as well as any other phenothiazine N,5-dioxide free bases within the scope of this invention can be converted to their acid addition salts, e.g., the hydrochloride, hydrobromide, sulfate, citrate, acetate, succinate, benzoate, salicylate, lactate, nitrate, phosphate, glycolate, tartrate, and ascorbate by neutralization with the appropriate acid.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of compounds of the structural formula:

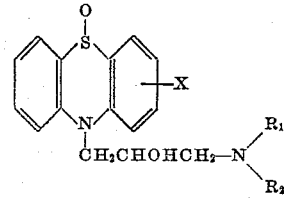

wherein X is a nuclear substituent selected from the group consisting of halogen, lower-alkoxy, and trihalomethyl, $R_1$ and $R_2$ taken individually represent lower-alkyl radicals and $R_1$ and $R_2$ taken together with —N< represent a radical selected from the group consisting of pyrrolidino, piperidino, morpholino, and methyl-substituted pyrrolidino radicals, inclusive, and the pharmacologically acceptable acid addition salts, the pharmacologically acceptable lower-alkyl quaternary ammonium salts, the N-oxides and the N-oxide pharmacologically acceptable acid addition salts thereof.

2. 10 - (3 - dimethylamino - 2 - hydroxypropyl) - 2-chlorophenothiazine sulfoxide.

3. 10 - (3 - dimethylamino - 2 - hydroxypropyl) - 2-chlorophenothiazine sulfoxide hydrochloride.

4. 10 - (3 - dimethylamino - 2 - hydroxypropyl) - 2-chlorophenothiazine N,5-dioxide.

5. 10 - (3 - dimethylamino - 2 - hydroxypropyl) - 2-chlorophenothiazine N,5-dioxide hydrochloride.

6. 10 - (3 - dimethylamino - 2 - hydroxypropyl) - 2-chlorophenothiazine sulfoxide methobromide.

References Cited in the file of this patent

UNITED STATES PATENTS

| | | |
|---|---|---|
| 2,534,237 | Cusic | Dec. 19, 1950 |
| 2,591,679 | Cusic | Apr. 8, 1952 |
| 2,595,215 | Charpentier | May 6, 1952 |
| 2,629,719 | Cusic | Feb. 24, 1953 |